United States Patent [19]

Wesch et al.

[11] Patent Number: 5,633,305
[45] Date of Patent: May 27, 1997

[54] COATING COMPOSITION WITH HEAT-CURING FILM FORMATION AND ITS USE

[75] Inventors: Karl Wesch, Waldbrunn; Dieter Stamm, Ladenburg; Dirk Reitenbach, Eppelheim; Winfried Schwittay, Wildberg, all of Germany

[73] Assignee: Teroson GmbH, Heidelberg, Germany

[21] Appl. No.: 448,449

[22] PCT Filed: Nov. 26, 1993

[86] PCT No.: PCT/EP93/03316

§ 371 Date: Jun. 5, 1995

§ 102(e) Date: Jun. 5, 1995

[87] PCT Pub. No.: WO94/13744

PCT Pub. Date: Jun. 23, 1994

[30] Foreign Application Priority Data

Dec. 4, 1992 [DE] Germany ............... 42 40 810.5

[51] Int. Cl.⁶ ............................................. C08K 5/10
[52] U.S. Cl. ..................... 524/296; 524/297; 524/479; 524/487; 524/561; 524/562; 524/563; 524/745; 428/344
[58] Field of Search ........................ 524/296, 297, 524/745, 561, 562, 563, 479, 487; 428/344

[56] References Cited

U.S. PATENT DOCUMENTS

| | | | |
|---|---|---|---|
| 4,150,192 | 4/1979 | Downey | 428/462 |
| 4,210,567 | 7/1980 | Kösters | 524/290 |
| 4,386,173 | 5/1983 | Chang | 523/453 |
| 4,957,955 | 9/1990 | Saur et al. | 524/114 |
| 5,001,188 | 3/1991 | Petrillo et al. | 524/745 |

FOREIGN PATENT DOCUMENTS

| | | |
|---|---|---|
| 0259271 | 3/1988 | European Pat. Off. . |
| 0261499 | 3/1988 | European Pat. Off. . |
| 0405879 | 1/1991 | European Pat. Off. . |
| 2454235 | 12/1976 | Germany . |
| 2529732 | 1/1977 | Germany . |
| 2825739 | 1/1979 | Germany . |
| 2755947 | 6/1979 | Germany . |
| 1919317 | 8/1981 | Germany . |
| 3008018 | 9/1981 | Germany . |
| 2711596 | 10/1986 | Germany . |
| 4034725 | 10/1990 | Germany . |
| 8904856 | 6/1989 | WIPO . |
| 8909803 | 10/1989 | WIPO . |

*Primary Examiner*—Paul R. Michl
*Assistant Examiner*—John J. Guarriello
*Attorney, Agent, or Firm*—Wayne C. Jaeschke; John Daniel Wood; Daniel S. Ortiz

[57] ABSTRACT

Coating compositions based on waxes, wax-like compounds, drying oils or alkyd resins are improved in their running behavior by the addition of additives which gel at elevated temperature. Other positive properties of the coating compositions, such as for example wetting, penetration (creepage), sprayability, are not adversely affected.

28 Claims, No Drawings

COATING COMPOSITION WITH HEAT-CURING FILM FORMATION AND ITS USE

BACKGROUND OF THE INVENTION

1. Field of the Invention

This invention relates to a coating composition based on waxes or wax-like compounds or air-drying oils or alkyd resins.

2. Discussion of Related Art

Metallic substrates are provided with film-forming coatings to protect them against corrosion. Several different types of coating are used for this purpose, depending on requirements. This applies in particular to steel substrates, as encountered for example in the automobile industry. Because of their design, automobile bodies, for example, have a number of awkwardly situated cavity voids and seams which are inadequately coated during normal lacquering processes and which are normally coated with waxes or wax-like compositions. These compositions are required to show very good wetting behavior and adhesion behavior with respect to the substrate to be coated, a good water (vapor) barrier effect and, during application, good creep behavior so that they are able under the effect of capillary forces to penetrate into the fine capillary cavities or seams and to displace any layers of water present. As mentioned above, these coatings are used in awkwardly situated places so that their mechanical strength, hardness and abrasion resistance generally have to meet only minimal requirements. These compositions are also commonly referred to as "cavity sealing compounds".

Waxes and/or fats or oils as binders have long been successfully used for these anticorrosive coatings. The waxes used may be vegetable waxes (for example carnauba wax, montan wax), animal waxes, mineral waxes, more particularly petrochemical waxes (petrolatum, oxidized petrolatum, paraffin waxes or microwaxes), chemically modified waxes or even synthetic waxes. In addition, drying oils or chemical modifications thereof, such as long-oil alkyd resins, for example, either on their own or in combination with the above-mentioned waxes, and also synthetic hydrocarbon resins may be used.

The anticorrosive coatings contain corrosion inhibitors as a further constituent. The corrosion inhibitors may be, for example, inorganic pigments, organic inhibitors such as, for example, amines or salts thereof or metal salt dispersions. One representative of metal salt dispersions, the so-called superbasic calcium salts of organic sulfonic acids, are used particularly frequently for anticorrosive coatings because they apparently form films highly impermeable to the diffusion of water vapor and, by virtue of their basic nature, are capable of neutralizing corrosion-promoting acid traces from the environment. A review of such metal salt dispersiens can be found, for example, in R. M. Morawek, Modern Paint Coatings, 69 (1979), 49–51. These metal salt dispersions are also commercially known by the name of "SACI" (severe atmospheric corrosion inhibitors).

The superbasic calcium salts of organic sulfonic acids are prepared, for example, by stirring calcium oxide and/or hydroxide into alcoholic or aqueous/alcohol solutions of sulfonic acids of paraffin hydrocarbons and subsequently introducing carbon dioxide, calcium oxide or hydroxide being used in such a quantity that a considerable excess of calcium oxide or hydroxide is left in the dispersion. Superbasic calcium sulfonates in the context of the present invention and their production and use as lubricants or rustproofing agents are described, for example, in DE 19 19 317 or in EP 405 879.

Other typical constituents of the formulations are pigments, including for example so-called anticorrosive pigments, and/or fillers, such as chalks (both natural ground and also finer precipitated chalks), grinding or dispersing aids in the form of fatty acid salts of organic amines and, where drying oils and/or alkyd resins are present, antiskinning agents and so-called dryers or siccatives which catalyze the oxidative crosslinking of the drying oils or alkyd resins.

The anticorrosive coating compositions may be sprayed on through special nozzles in the form of solutions or dispersions in organic solvents, such as hydrocarbons (gasolines) or chlorinated hydrocarbons, as described for example in DE-C-27 11 596. To avoid volatile organic constituents, a so-called "flood wax process" is proposed in DE-A 27 55 947. In this process, the cavities are "flooded" in a first step with molten wax-like corrosion-preventing materials. In a second step, the excess, still liquid material is allowed to run off from the cavities.

The anticorrosive coating compositions should preferably have a low viscosity to ensure that the metal surface, including the capillary cavities, are completely covered, even when the coating is applied in a thin layer. Accordingly, almost all compositions for these anticorrosive coatings, except the compositions for the flood wax process, are dilute solutions in readily volatile organic solvents or dispersions in organic solvents or water.

The solventless systems are, for example, anticorrosive oils similar to the compositions described in DE 19 19 317 consisting of a superbasic calcium sulfonate, mineral oil and a gasoline fraction ("Stoddard" solvent). These oils are generally sprayed at room temperature and form an oily, generally tacky film. After cooling, the flood waxes form a more or less solid film. In the case of the solventless products based on alkyd resins or drying oils, such as linseed oil varnish for example, gradual oxidative crosslinking of the film begins after application. In the case of the solvent-containing dispersions or solutions, film formation generally takes place purely physically after evaporation of the solvent.

The disadvantage of all the compositions for anticorrosive coatings described in the foregoing lies in their temperature sensitivity and in their very low mechanical stability immediately after application of the coating. In automobile construction, the coatings in question are applied at an early stage in the assembly process. In many cases, the coatings described above tend to "run" after drying, i.e. above all on further exposure to heat in the assembly process, the anticorrosive coatings already applied become so thinly liquid that the material runs or drips off the body, resulting in leaking and soiling of the bodies and of conveyor belts and assembly belts and work stations in the assembly shops. In addition, so-called "sump" formation can occur, i.e. the material which has run off collects in low-lying seams and cavities of the bodies. This interferes with subsequent assembly work.

There has been no shortage of attempts to overcome this deficiency. Thus, EP 259 271 describes the addition of vinyl polymers. These polymers are produced in situ in the anticorrosive composition by radical polymerization of vinyl monomers, such as methacrylic acid for example. Although this process reduces dripping after application of the composition to the body, the viscosity of the compositions is so high that only very dilute solutions or dispersions in organic solvents can be used. However, this is undesirable on ecological grounds.

DE-A-28 25 739 proposes a solventless anticorrosive composition. This composition consists essentially of a petroleum sulfonate complex of calcium and/or magnesium in a non-volatile diluting oil, oxidized petrolatum, microcrystalline wax, anticorrosive pigment and a thermoplastic hydrocarbon resin. Although this composition is free from volatile solvents, the material has to be heated to temperatures of 135° C. to 150° C. to be applied by spraying. Apart from the considerable effort involved in the production and application of the material, difficulties also occur in the uniform wetting of the cold substrates, such as automobile bodies for example. This can only be avoided by expensive heating of the bodies.

U.S. Pat. No. 4,386,173 similarly proposes anticorrosive compositions consisting of petroleum sulfonate complexes, waxes, pigments, fillers, non-volatile oils and an epoxy resin elastomer. These materials also have to be sprayed at temperatures of at least 135° C.

Accordingly, the problem addressed by the present invention was to provide a solventless or low-solvent anticorrosive coating composition which would show sufficiently low viscosity to be able to be sprayed at room temperature in conventional plants. In addition, the coating would be able to be converted by simple means into a form which would reliably prevent running and soiling of body parts and plant components.

SUMMARY OF THE INVENTION

According to the invention, the solution to this problem is characterized in that constituents which gel at relatively high temperatures are added to anticorrosive coating compositions known per se based on waxes, wax-like compounds or air-drying oils or alkyd resins, optionally solvents, non-volatile oils, flow control agents and corrosion-preventing additives. It has now surprisingly been found that even small additions of polymer powders and plasticizers known per se are sufficient to gel the coatings after application to the body at elevated temperatures in such a way that running or dripping in later stages of the assembly process is safely prevented. The positive properties of conventional anticorrosive compositions, such as good wetting, complete film formation, thorough penetration into capillary cavities and the prevention of rusting in the salt spray test according to DIN ISO 4326 or DIN 53167, remain intact.

DETAILED DESCRIPTION OF THE INVENTION

Basically, suitable polymer powders are any polymers which, with plasticizers, undergo a gelation process at relatively high temperatures similar to that known from PVC plastisols. The quantity of polymer powder added is governed by the viscosity of the basic formulation and the processing parameters and also by the application of the coating composition. It may amount to between 0.1 and 15% by weight of the composition, quantities of 3 to 7% by weight preferably being added. These polymer powders have to satisfy three key criteria, namely:

they must be fine enough to enable the dispersion to be readily applied in spraying installations; the particles (including agglomerate particles) should generally be smaller than 100 μm and preferably smaller than 60 μm;

the polymers should be insoluble or substantially insoluble or swellable at room temperature in the usual formulation ingredients, at the elevated gelation temperature, the polymer should be completely gelled in a short time by the addition of plasticizer and the plasticizer should not separate from the polymer phase after cooling.

Many conventional polymers satisfy these requirements, including for example: polyvinyl chloride, vinyl chloride/vinyl acetate copolymers, copolymers of $C_{1-8}$ alkyl esters of methacrylic acid or acrylic acid as described, for example, in DE-C-24 54 235 and in DE-C-25 29 732 (the latter may optionally contain further comonomers), polystyrene, copolymers of styrene with methacrylic acid, $C_{1-8}$ alkyl esters thereof and/or acrylonitrile which may optionally contain further comonomers. Examples of suitable styrene copolymers are described in DE-A-40 34 725 and in EP-A-261 499. Combinations of the polymer powders mentioned above are also possible.

The term "plasticizer" as used in the context of the present invention goes beyond the usual definition. Plasticizers known per se, such as the $C_{4-14}$ alkyl esters of phthalic acid, adipic acid or sebacic acid, alkyl sulfonic acid esters of phenol (as marketed, for example, under the name of "Mesamoll"), alkyl and/or aryl esters of phosphoric acid are as suitable for this purpose as esters of colophony resinic acids, aliphatic and/or aromatic hydrocarbon resins in combination with gasolines and also oximes which, hitherto, have only been described as antiskinning agents for drying oils or alkyd resins.

Plasticizers in the context of the present invention are any formulation constituents which, either on their own or in combination, have an adequate dissolving effect on the dispersed polymer powder(s) listed above at the elevated gelation temperature to be able to dissolve the powder and hence to initiate the gelation process. Before gelation, they should have a poor dissolving effect on the polymer powder at room temperature to guarantee high stability of the composition in storage. The quantity of plasticizer used is governed by the type and quantity of polymer powder and is between 0.1 and 15% by weight and preferably between 3 and 10% by weight.

To ensure that they have a suitable low viscosity, the low-solvent of solventless anticorrosive coating compositions normally contain relatively large quantities of nonvolatile oils, preferably drying oils such as, for example, linseed oil varnish or so-called long-oil alkyd resins.

The effect of the gelling additives is that, even after very brief exposure to heat, the coating compositions gel to such an extent that they do not run or drip, even on further exposure to heat. The gelling times are not critical, but are generally in the range from 3 to 20 minutes and preferably in the range from 5 to 10 minutes at temperatures of 60° C. to 160° C. and preferably at temperatures of 80° C. to 120° C. Heating may be carried out in conventional drying ovens of the type used in the lacquering of automobile bodies or by means of suitably arranged infrared (IR) heaters.

The following examples of two typical cavity sealing compounds clearly show that only relatively small quantities of the additives according to the invention gelling at relatively high temperatures are sufficient for clearly improving the running behavior of the cavity sealing compounds or anticorrosive coatings. In the following Examples, parts are by weight unless otherwise stated.

COMPARISON EXAMPLE 1

The following Example describes a coating composition containing approximately 60% by weight non-volatile constituents according to the prior art. The production process comprises three stages.

Preparation of the resin solution:

In a stirred tank, the following constituents are homogenized at about 70° to 80° C. by means of a high-speed stirrer, for example an Ultra-Turrax:

| | |
|---|---|
| Hydrocarbon resin of vinyl toluene/styrene/indene | 23.6 parts |
| Oxidized petrolatum, acid value 50 | 4.0 parts |
| Mixture of microparaffin wax and slack wax, solidification point around 65° C. | 4.0 parts |
| Acidic alkyl aryl polyglycol ether phosphate | 1.1 parts |
| Mixture of fatty acid alkanolamides | 2.2 parts |
| White spirit 135/180 | 33.1 parts |

After homogenization, the resin solution is cooled to room temperature.

Grinding paste:

The following constituents are homogenized for at least 5 minutes in a stirred tank equipped with a high-speed stirrer (for example an Ultra-Turrax):

| | |
|---|---|
| Superbasic calcium sulfonate in mineral oil (for example PCA 11507, a product of Exxon) | 8.0 parts |
| Calcium sulfonate/calcium carbonate complex with an addition of white spirit | 3.0 parts |
| Technical white oil | 9.4 parts |
| Precipitated chalk | 6.0 parts |
| Magnesium montmorillonite | 1.7 parts |
| White spirit 135/180 | 3.0 parts |
| n-Propanol | 0.9 part. |

During this mixing process, the grinding paste undergoes an increase in temperature to around 30° to 40° C. and is cooled to room temperature after homogenization.

The resin solution and the grinding paste are homogeneously mixed with one another at room temperature by means of a slowly rotating stirrer. The coating composition obtained has a solids content of approximately 60% by weight and a viscosity of 80 mPa.s.

EXAMPLE 2

(Invention):

3 Parts of a terpolymer consisting of approximately 64% of methyl methacrylate, 34% of butyl methacrylate and 2% of methacrylic acid are added to and mixed by means of a low-speed stirrer with 100 parts of the coating composition of Example 1 cooled to room temperature. Within the limits of measurement accuracy, the viscosity of this composition is no higher than that of Example 1.

EXAMPLE 3

(Invention):

As in Example 2, three parts of a styrene/methacrylic acid copolymer according to DE-A-40 34 725 are added to 100 parts of the coating composition of Example 1. In this case, too, there is no measurable change in the viscosity of the composition.

The suitability tests described in the following are carried out with the three coating compositions according Examples 1 to 3.

Running at 23° C.:

In this test, the running behavior of the coating composition at room temperature is tested by spotting 0.2 ml of the coating composition with an Eppendorf pipette or with a suitable disposable syringe onto a horizontally arranged steel plate, after which the plate is placed upright and left in that position until the material stops running. The length wetted by the material from the spotting point to the end point is then measured.

Running after heat treatment:

The coating composition is spotted onto the plate in the same way as described above, after which the plate is heated for 5 minutes at 80° C. in a horizontal position. The plate is then immediately placed upright and left until the material stops running. The length wetted by the material is then measured in the same way as described above.

Penetration—creepage:

Two 100 μm thick film strips are placed as spacers on a 200×100 mm steel plate at a distance of 50 mm parallel to the longitudinal edge of the plate. A second plate is applied to the first plate and screwed thereto. The second plate is curved through 45° C. along its minor axis so that the capillary cavity formed by the film strips between the two metal plates opens like a funnel. With the plates horizontally arranged, 2×5 ml of the coating composition are applied by pipette to the underneath of the upwardly curved side of the upper plate in such a way that the coating composition is able to flow downwards along the curved side into the capillary space. The assembly as a whole is then stored for 24 h in a DIN 50014 23/50-2 standard conditioning atmosphere. After the plates have been separated, the creepage of the coating composition in the capillary cavity is evaluated by measurement.

It can be seen from the results set out in the following Table that there is very little change in running at 23° C. between the coating composition of Example 1 and the Examples according to the invention. The same applies to penetration (creepage). However, running after brief heat treatment shows a drastic reduction as required.

TABLE 1

| | Example 1 | Example 2 | Example 3 |
|---|---|---|---|
| Running at 23° C. | 25 cm | 22 cm | 19 cm |
| Penetration at 23° C. | 12 cm | 10 cm | 8 cm |
| Running after 5 mins. at 80° C. | 13 cm | 6 cm | 1 cm |

COMPARISON EXAMPLE 4

This Example is a solventless coating according to the prior art. The following components are prepared in the same way as in Example 1:

| | |
|---|---|
| Resin solution | |
| Oxidized petrolatum, acid value 50 | 1.0 part |
| Calcium lanolate | 2.5 parts |
| Linseed oil varnish | 26.0 parts |
| Long-oil, solventless alkyd resin | 5.0 parts |
| Grinding paste | |
| Superbasic calcium sulfonate | 35.0 parts |
| Calcium sulfonate/calcium carbonate complex | 12.0 parts |
| Ground coated chalk | 17.0 parts |
| N-oleyl propylenediamine dioleate | 0.5 part |

After the grinding paste and the resin solution have been combined, 1.0 part of methylethyl ketoxime is added. The coating composition has a viscosity of 1,000 mPa.s. Although this viscosity is distinctly higher than that of the preceding formulations, these formulations can still be satisfactorily sprayed in conventional installations.

EXAMPLE 5

(Invention):

As in Example 2, three parts of the methacrylate copolymer are added to 100 parts of the coating composition of Example 4. There is no significant increase in viscosity.

EXAMPLE 6

(Invention):

As in Example 3, 3 parts of the styrene copolymer are added to 100 parts of the coating composition of Example 4. There is no significant increase in viscosity.

The results of the suitability tests are set out in Table 2.

TABLE 2

|  | Example 7 | Example 8 | Example 9 |
|---|---|---|---|
| Running at 23° C. | 18 cm | 11 cm | 12 cm |
| Penetration at 23° C. | 5 cm | 6 cm | 6 cm |
| Running after 5 mins. at 80° C. | 18 cm | 6 cm | 7 cm |

As can be seen from the Tables, the addition of the constituents according to the invention does not produce any significant change in running behavior at 23° C. in relation to the prior art. Similarly, penetration (creepage) at 23° C. is not significantly reduced by the additions according to the invention. This shows that neither wetting behavior nor creepage is significantly influenced by the additives according to the invention, nor are the other suitability tests, such as the salt spray test according to DIN 53167 or outdoor weathering tests or resistance to low temperatures, significantly influenced, above all adversely, by the additions according to the invention.

As can also be seen from the Tables, however, running after brief heating (5 minutes at 80° C.) is significantly reduced as required. The results of the laboratory tests are fully confirmed by practical tests.

We claim:

1. A cavity sealing composition comprising: (a) a film forming composition and (b) a gelling additive which gels at elevated temperatures, wherein the gelling additive comprises a fine polymer powder and a plasticizer for the fine polymer powder and wherein the polymer powder comprises from 0.1% to 15% by weigh of the sealing composition and the plasticizer comprises from 0.1% to 15% by weight of the sealing composition.

2. A composition as claimed in claim 1 wherein said gelling additive gels at a temperature of from 60° C. to 160° C.

3. A composition as claimed in claim 1 wherein said gelling additive gels at a temperature of from 80° C. to 120° C.

4. A composition as claimed in claim 1 wherein said fine polymer powder comprises a member selected from the group consisting of polyvinyl chloride, vinyl chloride/vinyl acetate copolymers, copolymers of $C_{1-8}$ alkyl esters of methacrylic acid with one or more comonomers, copolymers of $C_{1-8}$ alkyl esters acrylic acid with one or more comonomers, polystyrene, and copolymers of styrene with a member selected from the group consisting of methacrylic acid, $C_{1-8}$ alkyl esters of methacrylic acid, acrylic acid, $C_{1-8}$ alkyl esters of acrylic acid, and acrylonitrile, which copolymers of styrene may optionally contain further comonomers.

5. A composition as claimed in claim 1 wherein said fine polymer powder is present in said composition in an amount of from 3 to 7% by weight of said composition.

6. A composition as claimed in claim 1 wherein said plasticizer is selected from the group consisting of a $C_{4-14}$ alkyl ester of phthalic acid, a $C_{4-14}$ alkyl ester of adipic acid, a $C_{4-14}$ alkyl ester of sebacic acid, an alkyl sulfonic acid ester of phenol, an alkyl or aryl ester of phosphoric acid, an aliphatic and/or aromatic hydrocarbon resin, and an ester of a colophony resinic acid.

7. A composition as claimed in claim 1 wherein said plasticizer is present in said composition in an amount of from 3 to 10% by weight of said composition.

8. A composition as claimed in claim 1 wherein said film forming compound is selected from the group consisting of waxes, air-drying oils, and alkyd resins.

9. A composition as claimed in claim 1 wherein said film forming composition is selected from the group consisting of polyethylene waxes, paraffin waxes, microwaxes, hydrocarbon and/or ester resins, alkyd resins, drying oils, and mixtures thereof.

10. A composition as claimed in claim 1 further comprising a member selected from the group consisting of solvents, flow control agents and corrosion-preventing additives.

11. A composition as claimed in claim 1 further comprising a member selected from the group consisting of cationic wetting agents and interfacially active liquid resins as a flow control agent.

12. A composition as claimed in claim 1 further comprising a member selected from the group consisting of superbasic calcium sulfonates, fillers, anticorrosive pigments and metal salts of oxidized waxes as a corrosion-preventing additive.

13. A composition as claimed in claim 1 wherein said film forming composition is selected from the group consisting of waxes and drying oils.

14. A composition as claimed in claim 1 wherein said film forming composition is selected from the group consisting of vegetable waxes, animal waxes, mineral waxes, petrochemical waxes, chemically modified waxes, and synthetic waxes.

15. A composition as claimed in claim 1 wherein said film forming composition is a long-oil alkyd resin.

16. A composition useful as a cavity sealing composition comprising:

(a) a film forming composition selected from the group consisting of polyethylene waxes, paraffin waxes, microwaxes, hydrocarbon and/or ester resins, alkyd resins, drying oils, and a combination of said members, and (b) a gelling additive comprised of:

(i) a fine polymer powder, said fine polymer powder being comprised of a member selected from the group consisting of polyvinyl chloride, vinyl chloride/vinyl acetate copolymers, copolymers of $C_{1-8}$ alkyl esters of methacrylic acid with one or more comonomers, copolymers of $C_{1-8}$ alkyl esters acrylic acid with one or more comonomers, polystyrene, and copolymers of styrene with a member selected from the group consisting of methacrylic acid, $C_{1-8}$ alkyl esters of methacrylic acid, acrylic acid, $C_{1-8}$ alkyl esters of acrylic acid, and acrylonitrile, which copolymers of styrene may optionally contain further comonomers, wherein said fine polymer powder is present in said composition in an amount of from 0. 1 to 15% by weight of said composition, and (ii) a plasticizer for said fine polymer powder, wherein said plasticizer is selected from the group consisting of a $C_{4-14}$ alkyl ester of phthalic acid, a $C_{4-14}$ alkyl ester of adipic acid, a $C_{4-14}$ alkyl ester of sebacic acid, an alkyl sulfonic acid ester of phenol, an alkyl or aryl ester of phosphoric acid, an aliphatic and/or aromatic hydrocarbon resin, and an ester of a colophony resinic acid and wherein said plasticizer is present in said composition in an amount of from 0.1 to 15% by weight of said composition, wherein said gelling additive gels at a temperature of from 60° C. to 160° C.

17. A composition as claimed in claim 16 wherein the amount of said fine polymer powder is from 3 to 7% by weight of said composition, the amount of said plasticizer is from 3 to 10% by weight of said composition, and said gelling agent gels at a temperature of from 80° C. to 120° C.

18. A process for coating metallic objects, said process comprising; applying as a coating to a metallic object a composition comprising a film forming composition and a gelling additive which gels at elevated temperatures, the gelling additive comprising e fine polymer powder and a plasticizer for the fine polymer powder, wherein the fine polymer powder comprises from 0.1% to 15% by weight of the coating composition and the plasticizer comprises from 0.1% to 15% by weight of the coating composition and gelling said gelling additive in said coating composition.

19. A process as claimed in claim 18 wherein said gelling is at 60° C. to 160° C.

20. A process as claimed in claim 18 wherein said gelling is at 80° C. to 120° C.

21. A process as claimed in claim 18 wherein said applying is by spraying.

22. A process as claimed in claim 18 wherein said applying is by dipping.

23. A process as claimed in claim 18 wherein said composition contains, during said applying, volatile constituents and said process further comprised evaporating of said volatile constituents prior to said gelling.

24. A process as claimed in claim 18 wherein the coating is gelled in drying ovens.

25. A process as claimed in claim 18 wherein the coating is gel led by infrared heaters.

26. A process as claimed in claim 18 wherein said metallic object is an automobile body.

27. A process as claimed in claim 26 wherein that portion of said automobile body to which said composition is applied is in a cavity void.

28. A process as claimed in claim 26 wherein that portion of said automobile body to which said composition is applied is a seam.

* * * * *